May 3, 1960
C. L. WELLINGTON
2,934,811
METHOD OF INCREASING CAPACITANCE
Filed March 6, 1959
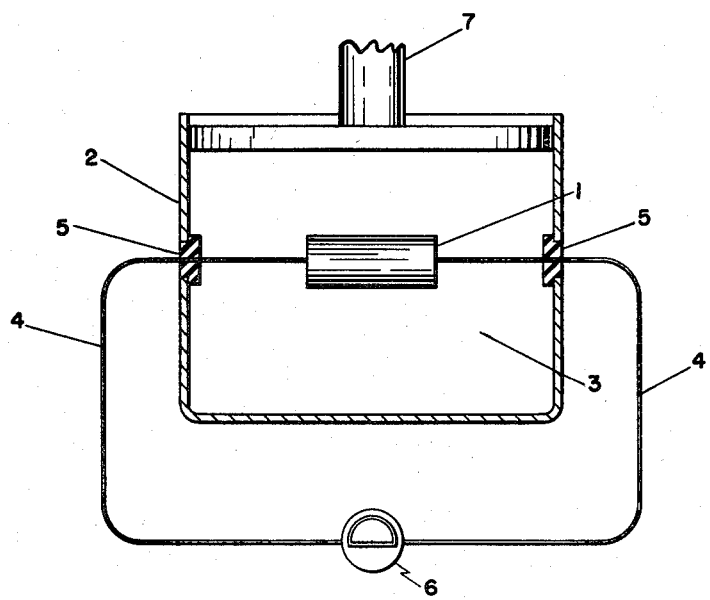
INVENTOR.
CARY L. WELLINGTON
BY
Howson & Howson
ATTORNEY – # United States Patent Office 2,934,811
Patented May 3, 1960

2,934,811

METHOD OF INCREASING CAPACITANCE

Cary L. Wellington, Englewood, N.J., assignor to The Condenser Machinery Corp., Englewood, N.J., a corporation of New York Application March 6, 1959, Serial No. 797,729

5 Claims. (Cl. 29—25.42)

This invention relates to a method of increasing the capacitance of capacitors and more particularly to the method of increasing capacitance of capacitors on a mass production scale to much closer tolerances than is presently done by manual techniques. This is a continuation-in-part of my U.S. patent application Serial No. 618,200, filed October 25, 1956, now abandoned.

Certain types of capacitors, particularly those employing a deformable dielectric as the insulator between electrodes, are capable of having their capacitance increased by squeezing. Heretofore this has been accomplished by squeezing the capacitor in an arbor press or otherwise mechanically compressing the structure. Frequently, it may take several squeezing operations to increase the capacitance in the amount desired, and unless much care is taken it will be difficult to obtain a capacitor having a capacitance within useful tolerances of the desired level. Alternatively with certain types of insulators it is possible to increase capacitance by heating the capacitor to cause a flow of the insulator, but this process is likewise subject to difficulties, particularly the difficulty of regulating thermal inertia so that overheating will not occur.

The arbor press technique of mechanically compressing capacitors had the tendency of squeezing the dielectric or metal, whichever was more easily plastically deformed, outwardly away from the region of compression. The effect might be to actually decrease capacitance in certain areas while increasing capacitance in others, and the nature of the changes in any event is often nonlinear and completely unpredictable. Physically as the dielectric thins in certain areas, it thickens in others. This effect provides a practical limit to the force which can be applied by mechanical compression. Moreover, high pressures, such as those employed routinely in the present invention, would cause flattening of the capacitors with accompanying folding and creasing of the electrodes and dielectric materials which in turn might cause rupture of either material producing either an open in one plate or a short circuit between plates.

The present invention is intended to overcome difficulties encountered in known processes and to provide an improved and highly accurate method of increasing capacitance in the types of capacitors described. In accordance with the present invention using production line techniques capacitors can have their capacitance increased, to a degree of accuracy heretofore obtained only in laboratories. Moreover, the method of the present invention can be performed in seconds where minutes have been required heretofore. Automatic control is possible, thereby effecting further savings in manufacturing costs.

According to the present invention, the capacitance of a capacitor is increased by subjecting its assembled electrodes to the static pressure of a fluid in which the capacitor is immersed. The method preferably includes observing the increase in capacitance on a capacitance measuring device to which the capacitor electrodes are connected so that fluid pressure can be removed when the desired increase in capacitance has been attained. The immersion in fluid permits force to be applied evenly to all surfaces. Thus, instead of unequal distribution of force, there results a distribution which tends to be uniform and the effect is thereafter more purely compressional than the plastic flow effect of the prior art. There is no tendency for the dielectric to thin out and rupture or for either the metal or dielectric to crease and break even though the pressures employed are commonly many times those employed in the prior art. Higher pressures not only are permissible but desirable to provide a permanent change in capacitance and minimize the tendency of the dielectric and metal to resiliently restore itself so that capacitance once attained tends to be more stable than in the prior art.

One apparatus for accomplishing this increase comprises an enclosure for the capacitor wherein fluid may be introduced under pressure together with means for increasing the fluid pressure and means for relieving the pressure. In addition the apparatus preferably includes a capacitance measuring device which is best located outside the enclosure and connected to conductors which extend through the walls of the enclosure and enable connection to the capacitor electrodes.

For a better understanding of the present invention reference is made to the drawing which is a schematic representation of an apparatus of the present invention partially in section.

In the usual situation the capacitors to which the present invention is applicable are of the so-called "plastic dielectric" type. In accordance with the present practice a plastic dielectric capacitor is made by spirally rolling together a sandwich of ribbons of plastic material and metal foil. The ribbons of plastic material lie between and insulate the foil ribbons which serve as the electrodes or plates of the capacitor. The material used for the electrodes is commonly aluminum foil, although it may be another metal foil, and the material used for the dielectric is commonly a material known as "Mylar," although other plastically deformable substances are also useful.

A strip or ribbon of Mylar .0005" thick has amazing dielectric properties and may be the only dielectric necessary between metallic electrodes. In fact, a dielectric of this thickness is easily capable of withstanding 600 volts of working potential. A particular property of Mylar which makes it useful in accordance with the present invention is its ability to withstand pressure and to even flow slightly under pressure in order to fill pin holes and weak spots which may occur in the material. Thus, under the compressive forces required in accordance with the present invention, the dielectric properties of Mylar instead of deteriorating may actually improve.

In the drawing a preferred form of the apparatus of the present invention is illustrated with a plastic foil capacitor 1 enclosed, the plastic foil capacitor being of the type described employing Mylar insulation. The apparatus itself includes, as a primary element, an enclosure 2 which is preferably a cylindrical can having one open end and one closed end defining a cavity 3 in which the capacitor 1 is placed. The walls of the enclosure 2 are of sufficient strength to withstand the increased pressure required for accomplishing the method of the present invention. Extending through the walls of the enclosure are conductors 4 which extend through fluid tight bushings 5 which are capable of withstanding the fluid pressure required within the enclosure without permitting leakage to any serious degree. The conductors may be attached directly to the electrodes but preferably are attached to tabs or terminals on the opposite ends of the capacitor 1, which terminals are arranged so that one is connected to one of the electrodes of the capacitor and the other is connected to the other electrode. The conductors 4 are, in turn, attached to a capacitance measuring device 6 which may be a capacitance bridge or other suitable capacitance measuring apparatus.

Completing the enclosure is a piston generally designated 7 which is of such shape, size and arrangement that it completely closes the open end of the can-like enclosure 2 and is readily removable therefrom to permit introduction and removal of capacitors being tested. This piston 7 is provided with sufficiently close fitting edges that, as it is moved inwardly into the enclosure, it causes compression of the air within the enclosure and thus increases the static pressure on all surfaces within the enclosure including the electrodes of the capacitor. The pressure upon the electrodes in the capacitor causes the electrodes to become more intimately in contact with the Mylar dielectric and may cause the Mylar dielectric to actually flow so that the plates of the capacitor are brought more closely together and hence their capacitance is increased.

In the course of compression of the capacitor the capacitance measuring device 6 which is provided with some sort of capacitance indicator may be read, and accordingly it is possible for the compression to continue until just the exact amount of desired capacitance is obtained. As a practical matter, it may be necessary to exceed the compression required for the desired amount of capacitance, since, due to the resilience of the material compressed, even with the high pressures contemplated there will undoubtedly be some recovery from a compression, and hence decrease of capacitance from its maximum point. The amount of decrease can be observed, however, and the operator of the apparatus can make sufficient allowance for it by permitting increase of the capacitance reading beyond the desired capacitance in order to obtain a final capacitance of the desired reading. Using high pressures the amount of resilient spring back is minimized.

Submersion of the capacitor in fluid enables its compression from all directions rather than from just two directions as in the prior art. Consequently, rather than tending to squeeze material laterally outwardly from between the compressed regions, the tendency is to compress the dielectric uniformly in all directions. There results more uniform compression, and the tendency of different increments of area to be effected differently is overcome.

The apparatus shown provides only one method of accomplishing the ends of the present invention. It is, of course, possible to employ other types of apparatus wherein pressure may be supplied to the enclosure through a valve in a line connecting the enclosure to a supply of gas or liquid at high pressure so that, once the capacitor is deposited in the enclosure and the enclosure made essentially fluid tight, the fluid (be it gas or liquid) under pressure may be permitted to enter the enclosure to increase the static pressure. The amount and rate of supply of pressure may be controlled by the operation of the valve. Release of the pressure after the desired capacitance is obtained may be accomplished by opening the enclosure or alternatively by providing another valve to release the pressure.

Particularly high quality capacitors may be obtained using a modified form of the apparatus described. In this modified form preferably three ducts are provided into the enclosure and provided with suitable valves. One of the ducts is preferably provided through the piston and connected to a vacuum pump capable of producing a vacuum of 50 microns within the enclosure. Another of the ducts is also preferably provided through the piston and connected to a liquid supply. The third duct is preferably provided in the bottom of the enclosure for removal of the liquid.

In the use of this modified device, a vacuum of approximately 50 microns is produced and held within the enclosure for approximately two hours. This continuous pumping will tend to draw off air molecules occluded between the metal and Mylar layers so that a more intimate bond between them is possible. Thereafter, the liquid is permitted to flow into the enclosure until the enclosure is full or almost full and the liquid supply is then cut off. The vacuum pump can be continued all during this process. Next, the piston is moved against the liquid to increase the internal pressure in the liquid as transmitted to all solid surfaces which the liquid contacts such as the surface of capacitor 1. Finally, when the process has been completed, the enclosure can be drained through the third duct and the capacitor removed from the enclosure.

Actual pressures employed may differ from one situation to another. Compression pressures will be generally greater than the pressure which could be withstood by an arbor press arrangement or other system in which pressure is applied to only two opposed sides. Pressures well in excess of 100 pounds per square inch can be used in substantially all cases and in many instances pressures substantially in excess of 1000 pounds per square inch up to 10,000 pounds per square inch will be employed.

In some cases a capacitance measuring device is unnecessary, it being ascertained by experience that a certain amount of compression is required on the average for a particular type of capacitor to accomplish the desired increase in capacitance, and the capacitor being treated either automatically or manually according to a standard sequence of operations for a standard amount of time. In this case, the capacitance of all capacitors may later be tested to determine which capacitors are within tolerance and which are outside tolerance. Under such circumstances, it may be desirable to handle more than a single capacitor at a time within the enclosure. Moreover, in some instances, it may be desirable to employ equipment which is essentially automatic, i.e., equipment in which capacitors come or are moved automatically into place within the enclosure, the enclosure closes, pressure increases and, once the desired capacitance is obtained, the capacitor is automatically ejected and another substituted in its place.

Several modifications of the present invention have been described and other such modifications will occur to one skilled in the art. All such modifications within the scope of the claims are intended to be within the scope and spirit of the present invention.

I claim:

1. The method of increasing the capacitance of a capacitor, employing a deformable dielectric between its flexible electrodes which assembly is spirally wound into a package, comprising subjecting its assembled electrodes to a uniform pressure in all directions applied by the static pressure of a fluid in which it is immersed.

2. The method of claim 1 in which the capacitor electrodes are connected to a capacitance measuring device and the fluid pressure is removed when a desired increase in capacitance has been obtained as indicated by the measuring device.

3. The method of increasing the capacitance of a capacitor employing a deformable dielectric between its flexible electrodes which in assembly is spirally wound into a package comprising immersing the assembled electrodes into a pressure supplying fluid and subjecting the fluid to pressure to provide a uniform pressure in all directions due to the static pressure of the fluid in which it is immersed, said pressure being greater than that which could be withstood were two sides of the device compressed, 4. The method of claim 3 in which the pressure exceeds 100 pounds per square inch.

5. The method of claim 4 in which the capacitor electrodes are connected to a capacitance measuring device and the fluid pressure is removed when the desired increase of capacitance has been obtained as indicated by the measuring device.

References Cited in the file of this patent

UNITED STATES PATENTS

| 1,939,883 | Edwards et al. | Dec. 19, 1933 |
| 2,865,083 | Kater et al. | Dec. 23, 1958 |

FOREIGN PATENTS

| 246,115 | Switzerland | Nov. 17, 1947 |